Aug. 30, 1966 J. F. McNULTY 3,270,265
ELECTROMAGNETIC FRICTION BRAKING ARRANGEMENT
Filed June 3, 1963

INVENTOR.
JOHN F. McNULTY
BY
*Lyon & Lyon*
ATTORNEYS

United States Patent Office 3,270,265
Patented August 30, 1966

3,270,265
ELECTROMAGNETIC FRICTION BRAKING ARRANGEMENT
John F. McNulty, Glendale, Calif., assignor, by mesne assignments, to International Telephone and Telegraph Corporation, New York, N.Y., a corporation of Maryland
Filed June 3, 1963, Ser. No. 285,010
9 Claims. (Cl. 318—372)

The present invention relates to a braking system which is particularly useful in conjunction with a motor-driven proportioning control although in its broader aspects the invention is not limited to this specific use.

It is desirable in certain control systems in which valves, dampers and similar devices are moved to controlled positions, to maintain such devices locked in their adjusted positions but to allow such devices to return to a predetermined safe position in the event of power failure to the system. The braking arrangement described herein is particularly suitable for use in such systems wherein an element or device is required to be positioned, and when positioned, locked in position, but then unlocked in the event of power failure to allow the device to return to a safe or desired position.

It is, therefore, a general object of the present invention to provide means and techniques whereby the above mentioned operation is accomplished.

A specific object of the present invention is to provide a braking system for a motor in which the brake is released when the motor is energized, which is set in braking condition when the motor is de-energized and power is still available, and which is released when there is a power failure that results in a voltage unavailable for energizing the motor.

Another specific object of the present invention is to provide an electrically actuated brake which is automatically released when there is power failure in the system.

Another specific object of the present invention is to provide a novel brake construction involving generally an electromagnet having two windings thereon with only one of the windings being energized when the brake is set and which requires the energization of both windings to release the brake.

Another specific object of the present invention is to provide a system of this character wherein the two windings mentioned in the previous paragraph are inter-connected in relationship to a reversible motor such that the two windings are energized when the brake is released, only one of the windings being energized when the motor is de-energized to lock the motor shaft in an adjusted position, and neither of the two windings being energized when there is power failure so that the brake may be released and the motor shaft free to rotate to a predetermined position.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
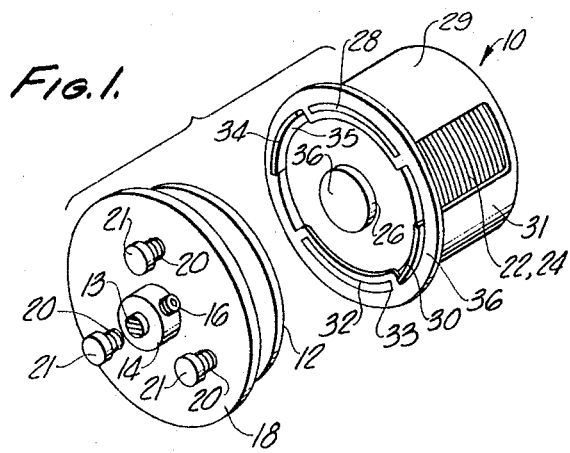
FIGURE 1 is a perspective view illustrating elements of a brake embodying features of the present invention.

Referring to FIGURE 1, there is provided an electromagnet 10 which is stationarily mounted and a rotatable spring-urged disk or brake plate 12 cooperating magnetically with the electromagnet 10. The brake disk 12 is slidably mounted on the hub member 14 which may be secured to a motor shaft 13 by fastening screw 16. The brake disk 12 is urged towards the flanged portion 18 of the hub member 14 by three coil compression springs 20, each having one of its ends bearing against the flanged portion 18 and the other one of its ends bearing against the head portion of a corresponding bolt 21, which passes through an enlarged apertured portion in the flanged portion 18 and which is threaded in the brake disk 12.

The electromagnet 10 includes a pair of windings 22, 24 (referred to later in connection with FIGURES 2 and 3) wound around the center cylindrical leg 26 of a magnetizable core member having four outer legs 29, 31, 33 and 35 integrally formed with the center leg 26 and terminating in a common plane to provide the four pole faces 28, 30, 32 and 34, respectively, the center leg 26 terminating in the circular pole face 36 which is coplanar with the arcuate shaped pole faces 28, 30, 32 and 34. These four arcuate pole faces 28, 30, 32 and 34 when the brake is intended for use with alternating current, extend through slotted portions of a shading coil ring 36A, of good conductive materials, such as, for example, copper, this shading coil ring 36A being firmly secured to the pole pieces 28, 30, 32 and 34 which extend through a correspondingly shaped slotted portion of ring 36A.

It will be seen from the foregoing description, that when the electromagnet 10 is energized, the brake disk 12 is attracted to and engages the five pole faces of the electromagnet to lock the brake disk 12 and the hub member 14 connected thereto in a locked condition to prevent rotation of a motor shaft 13 secured to the hub portion 14. The particular mounting of the brake disk 12 allows itself to be mechanically aligned with these five pole pieces so that a flat engagement of the disk 12 with each of the pole pieces is assured.

Figure 2:
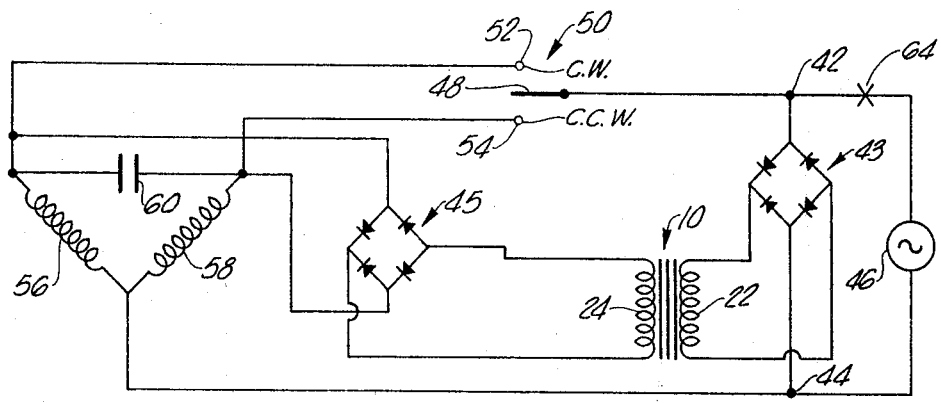
FIGURE 2 and FIGURE 3 are each schematic representations showing different manners in which the two coils of the brake of FIGURE 1 are inter-connected in a control circuit, also in accordance with features of the present invention.
Figure 3:
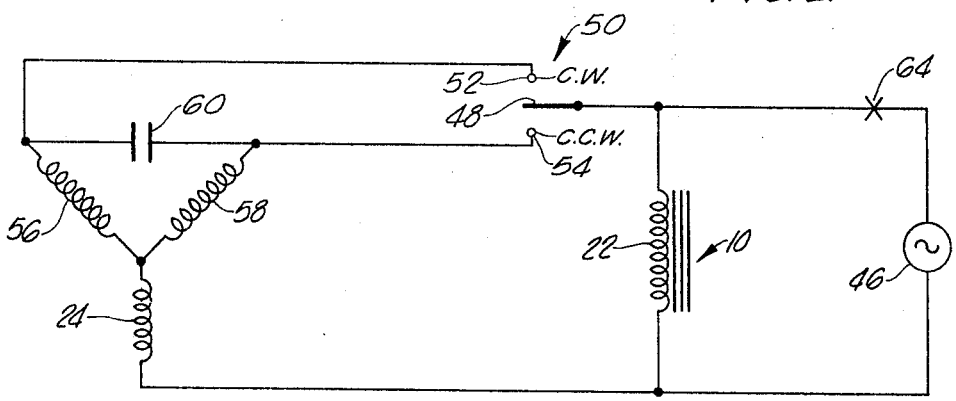

The windings 22, 24 of the electromagnet are connected in a control system as shown in FIGURES 2 and 3.

The windings 22 and 24 each have the same number of turns but are connected electrically to have opposite effects on the core structure 10; i.e., when the windings 22 and 24 are both energized there is substantially a net magnetic flux of zero, insufficient to maintain the brake disk 12 in its attracted position. The windings 22 and 24 may be halves of a center tapped winding when used in a system as described later in connection with FIGURE 3.

In FIGURE 2 the winding 22 has its terminals connected to the D.C. output terminals of a bridge type rectifier 43 having its input terminals connected to the input terminals 42 and 44 which latter terminals comprise the input terminals for the voltage source 46. Terminal 42 is connected to the movable arm 48 of the single pole double throw switch 50 having its stationary contacts 52 and 54 connected, respectively, to one terminal of the motor windings 56 and 58, the other terminals of the windings 56 and 58 each being connected to the input terminal 44. Winding 24 has its opposite terminals connected to the D.C. output terminals of bridge type rectifier 45 having its input terminals connected, respectively, to the stationary switch contacts 52 and 54 and shunted by a capacitor 60.

When the switch arm 48 is in neutral position as shown, the motor windings 56 and 58 are each de-energized and only the winding 22 is energized so that in this condition of switch 50 the core structure 10 is magnetized to attract and maintain the brake disk 12 in a locked condition with the shaft 13 of the motor connected to the hub 14 also locked against rotation. When the switch arm 48 engages the upper contact 52 the motor winding 56 is energized as is also the brake winding 24. This energization of winding 24 occurring simultaneously with the energization of winding 22 neutralizes the flux in the core structure 10 to allow the brake disk 12 to move to its non-attracted position under the influence of springs 20, whereupon the motor shaft 13 may then rotate in a clockwise direction established by this energization of the motor winding 56. When the switch arm 48 engages the stationary contact 54 the motor winding 58 and the brake winding 24 are both energized, and winding 24 then being energized simultaneously with brake winding 22 results in a neutralization of the magnetic flux in the core structure 10, whereupon the motor then rotates in a counter-clockwise direction in accordance with the energization of the motor winding 58.

It will be seen that when the switch arm 48 is returned to its neutral position from power engagement with either the stationary contact 52 or stationary contact 54, the brake is automatically applied since in such case the winding 24 is de-energized and only the winding 22 is energized and thus effective to lock the motor shaft. Should there be a power failure in source 46 as indicated by a break 64 in the lead extending from source 46 to terminal 42, then the winding 22 is, of course, de-energized and the brake disk 12, under the influence of springs 20, moves out of locking or braking engagement with the core structure 10, whereupon the motor shaft is free to rotate; and in a proportioning control system, when such power failure occurs, means (not shown) may be rendered effective to return the motor shaft to a predetermined or safe initial position.

The capacitor 60 may be used for phase splitting purpose for effecting starting and reversing the direction of rotation of the motor having two equal windings.

In the system shown in FIGURE 3, the brake winding 24 is connected somewhat differently with respect to the motor windings 56 and 58 so as to allow the use of a center tapped coil which comprises the two halves 22 and 24. Corresponding elements in FIGURES 2 and 3 are designated by identical reference numerals for ease of comparison and in both systems the same results are achieved, the significant difference being that in FIGURE 2 the coils 22 and 24 are energized with direct current which then renders the shading coil ring 36A useless; and also in FIGURE 3, the winding 24 is connected in a series circuit with that particular motor winding which is being energized for rotation of the motor; whereas, in FIGURE 2, the energizing A.C. current for effecting energization of the coil 24 flows through the opposite motor winding, but since the impedance offered by the energizing circuit for coil 24 is relatively high in comparison with the motor windings, the motor will be rotated in that direction selected by switch 50.

It will be appreciated that a brake for these purposes may have two windings, each with the same or with a different number of turns may be provided so long as when both are energized there is sufficient reduction of magnetic flux to cause the brake to release.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:
1. A magnetic brake for a motor driven rotatable element including a fixed core structure having a pair of oppositely poled windings thereon for generating a magnetic flux in said core structure; a motor for rotating said motor driven element; a brake member on said driven element including biasing means normally maintaining said brake member out of locking engagement with said core structure, said brake member being positioned in flux-linking relationship with said core structure and movable into locking engagement therewith responsive to the said generation of magnetic flux to lock said driven member in any rotated position; selectively operable means for energizing one of said windings to move said brake member into locking engagement with said core structure, for concurrently energizing said motor and both of said windings for releasing said brake member from locking engagement with said core structure, and for energizing said motor to drive said unlocked driven member; and said biasing means on said brake member responsive to de-energization of both of said windings moving said brake member out of locking engagement with said core structure.

2. An arrangement as set forth in claim 1 in which said windings comprise halves of a center tapped winding.

3. An arrangement as set forth in claim 1 in which said core structure has a common leg and said windings are wound on said leg with each of said windings having substantially the same number of turns.

4. An arrangement as set forth in claim 1 in which said core structure includes a center leg terminating at one end at a pole face and joined at the other end with a plurality of circumferentially spaced pole elements surrounding said center pole and with each of the poles terminating in pole faces each lying in the same plane.

5. An arrangement as set forth in claim 4 in which said circumferentially disposed pole members extend through circumferentially spaced slotted portions in a shading coil ring.

6. An arrangement as set forth in claim 5 in which said brake element is loosely mounted and spring-urged with respect to a flanged hub allowing the brake element to adjust itself with respect to said pole faces.

7. A system as set forth in claim 1 in which said windings are energizable with a direct current.

8. A system as set forth in claim 1 in which said windings are energizable with an alternating current.

9. A system as set forth in claim 1 in which said selectively operable means comprises a single pole double throw switch.

References Cited by the Examiner
UNITED STATES PATENTS

| | | | |
|---|---|---|---|
| 2,558,594 | 6/1951 | Tritle. | |
| 2,892,088 | 6/1959 | Yerkovich | 188—163 X |
| 3,045,166 | 7/1962 | Robinson | 318—372 X |
| 3,087,104 | 4/1963 | Berman | 318—372 X |

ORIS L. RADER, *Primary Examiner.*

J. C. BERENZWEIG, *Assistant Examiner.*